US012802227B2

(12) United States Patent
Wang et al.

(10) Patent No.: US 12,802,227 B2
(45) Date of Patent: Nov. 17, 2026

(54) IMAGE PROCESSING METHOD, APPARATUS AND DEVICE

(71) Applicant: Hangzhou Hikimaging Technology Co., Ltd., Hangzhou (CN)

(72) Inventors: Jing Wang, Hangzhou (CN); Guanglin He, Hangzhou (CN); Lulu Zhou, Hangzhou (CN)

(73) Assignee: Hangzhou Hikimaging Technology Co., Ltd., Hangzhou (CN)

( * ) Notice: Subject to any disclaimer, the term of this patent is extended or adjusted under 35 U.S.C. 154(b) by 285 days.

(21) Appl. No.: 18/717,845

(22) PCT Filed: Aug. 29, 2022

(86) PCT No.: PCT/CN2022/115375
§ 371 (c)(1),
(2) Date: Jun. 7, 2024

(87) PCT Pub. No.: WO2023/103467
PCT Pub. Date: Jun. 15, 2023

(65) Prior Publication Data

US 2025/0029255 A1 Jan. 23, 2025

(30) Foreign Application Priority Data

Dec. 9, 2021 (CN) .......................... 202111501127.8

(51) Int. Cl.
*G06T 7/00* (2017.01)
*G06T 7/11* (2017.01)
(Continued)

(52) U.S. Cl.
CPC .............. *G06T 7/0014* (2013.01); *G06T 7/11* (2017.01); *G06T 7/13* (2017.01); *G06T 7/174* (2017.01);
(Continued)

(58) Field of Classification Search
CPC . G06T 7/0014; G06T 7/11; G06T 7/13; G06T 7/174; G06T 7/90;
(Continued)

(56) References Cited

U.S. PATENT DOCUMENTS 9,518,924 B2 12/2016 Kubo et al.
11,227,683 B2 * 1/2022 Morard .................. G06T 7/174
(Continued)

FOREIGN PATENT DOCUMENTS

CN 110765999 2/2020
CN 110811495 2/2020
(Continued)

OTHER PUBLICATIONS

Office Action in Chinese Appln. No. 202111501127.8, mailed on Nov. 29, 2024, 19 pages (with English translation).
(Continued)

*Primary Examiner* — Emily C Terrell
*Assistant Examiner* — Ahmed A Nasher
(74) *Attorney, Agent, or Firm* — Fish & Richardson P.C.

(57) ABSTRACT

The present disclosure provides an image processing method, apparatus and device, the method includes: acquiring a visible light image and a fluorescence image corresponding to a designated location inside a target object, where the designated location inside the target object includes diseased tissue and normal tissue; determining a to-be-cut boundary corresponding to the diseased tissue from a to-be-detected image, where the to-be-detected image is the fluorescence image or a fused image of the visible light image and the fluorescence image; and generating a target image, the target image includes the visible light image and the to-be-cut boundary.

12 Claims, 6 Drawing Sheets

(51) Int. Cl.
*G06T 7/13* (2017.01)
*G06T 7/174* (2017.01)
*G06T 7/90* (2017.01)

(52) U.S. Cl.
CPC ...... *G06T 7/90* (2017.01); *G06T 2207/10024* (2013.01); *G06T 2207/10064* (2013.01); *G06T 2207/10068* (2013.01); *G06T 2207/20221* (2013.01); *G06T 2207/30096* (2013.01)

(58) Field of Classification Search
CPC . G06T 2207/10024; G06T 2207/10064; G06T 2207/10068; G06T 2207/20221; G06T 2207/30096; G06T 2207/20081; G06T 2207/20084
See application file for complete search history.

(56) References Cited

U.S. PATENT DOCUMENTS

| | | | | |
|---|---|---|---|---|
| 2012/0302893 | A1 | 11/2012 | Ishihara | |
| 2012/0323072 | A1 | 12/2012 | Ishihara | |
| 2013/0044126 | A1 | 2/2013 | Yamada | |
| 2014/0247977 | A1* | 9/2014 | Han | G06T 7/11 382/159 |
| 2014/0296718 | A1 | 10/2014 | Kishima | |
| 2015/0016705 | A1* | 1/2015 | Kubo | A61B 1/043 382/132 |
| 2015/0065859 | A1* | 3/2015 | Hwang | A61B 5/0035 600/440 |
| 2019/0346367 | A1* | 11/2019 | Zhu | G06T 5/70 |
| 2020/0193139 | A1* | 6/2020 | Behrooz | G06T 5/30 |
| 2020/0219237 | A1* | 7/2020 | Ramsay | G06T 5/50 |

FOREIGN PATENT DOCUMENTS

| | | |
|---|---|---|
| CN | 111513660 | 8/2020 |
| CN | 112837325 | 5/2021 |
| CN | 113208567 | 8/2021 |
| CN | 114298980 | 4/2022 |
| WO | WO 2020095987 | 5/2020 |
| WO | WO 2021075418 | 4/2021 |

OTHER PUBLICATIONS

International Search Report and Written Opinion in International Appln. No. PCT/CN2022/115375, mailed on Nov. 25, 2022, 14 pages (with partial English translation).
Extended European Search Report in European Appln. No. 22902899.8, mailed on Feb. 28, 2025, 10 pages.
Lauwerends et al., "Real-time fluorescence imaging in intraoperative decision making for cancer surgery," The Lancet Oncology, May 2021, 22(5):e186-e195.

* cited by examiner

IMAGE PROCESSING METHOD, APPARATUS AND DEVICE

CROSS-REFERENCE TO RELATED APPLICATIONS

This application is a national stage of international PCT Application No. PCT/CN2022/115375, filed on Aug. 29, 2022, which claims priority to Chinese Patent Application No. 202111501127.8, filed on Dec. 9, 2021, the entire contents of which are incorporated herein by reference.

TECHNICAL FIELD

The present disclosure relates to medical technology, and in particular to an image processing method, apparatus, and device.

BACKGROUND

An endoscope is a commonly used medical instrument, consisting of a light guide structure and a group of lenses. After an endoscope enters a target object, the endoscope may be used to collect a visible light image and a fluorescence image of a designated location inside the target object, and generate a fused image based on the visible light image and the fluorescence image. The fused image can clearly display the normal tissue and the diseased tissue at the designated location inside the target object, i.e., the normal tissue and the diseased tissue at the designated location inside the target object can be distinguished based on the fused image, such that the target object can be inspected and treated based on the fused image, which can accurately determine which tissue needs to be cut.

When a fused image is generated based on a visible light image and a fluorescence image, the fluorescence image is superimposed on the visible light image for display, which may result in a part of the visible light image to be covered, causing certain visual obstacles, and subsequently resulting in a poor effect of the fused image and failure to clearly display the normal tissue and the diseased tissue at a designated location inside a target object, which affects the quality and efficiency of a doctor's operation and provides poor use experiences.

In view of this, the present disclosure provides an image processing method to improve the quality and efficiency of a doctor's operation.

SUMMARY

The present disclosure provides an image processing method, including: acquiring a visible light image and a fluorescence image corresponding to a designated location inside a target object, where the designated location includes diseased tissue and normal tissue; determining a to-be-cut boundary corresponding to the diseased tissue from a to-be-detected image, where the to-be-detected image is the fluorescence image, or the to-be-detected image is a fused image of the visible light image and the fluorescence image; and generating a target image, where the target image includes the visible light image and the to-be-cut boundary.

The present disclosure provides an image processing apparatus, including: an acquisition module, configured to acquire a visible light image and a fluorescence image corresponding to a designated location inside a target object, where the designated location includes diseased tissue and normal tissue; a determination module, configured to determine a to-be-cut boundary corresponding to the diseased tissue from a to-be-detected image, where the to-be-detected image is the fluorescence image, or the to-be-detected image is a fused image of the visible light image and the fluorescence image; and a generating module, configured to generate a target image, where the target image includes the visible light image and the to-be-cut boundary.

The present disclosure provides an image processing device, including: a processor and a machine-readable storage medium, where the machine-readable storage medium stores machine-executable instructions that can be executed by the processor, and the processor is configured to execute the machine-executable instructions to implement the image processing method disclosed in the examples of the present disclosure.

The present disclosure provides a machine-readable storage medium storing computer instructions, and when the computer instructions are called by one or more processors, the above image processing method is executed by the one or more processors.

It can be seen from the above technical solution that in embodiments of the present disclosure, the to-be-cut boundary corresponding to the diseased tissue (i.e., the boundary of the focus region) may be determined. and a target image is generated based on the visible light image and the to-be-cut boundary, i.e., the to-be-cut boundary is superimposed on the visible light image for display. Since the to-be-cut boundary is superimposed on the visible light image for display instead of superimposing the fluorescent image on the visible light image for display, the problem of most parts of the visible light images being covered is avoided, the situation of visible light images being covered by fluorescent development is improved, and visual obstructions are avoided or alleviated. The effect of the target image is better, which can clearly display the normal tissue and diseased tissue at the designated location inside the target object, improving the quality and efficiency of the doctor's operation and providing a better user experience. Since the target image has a to-be-cut boundary, the doctor may know the to-be-cut boundary corresponding to the diseased tissue, and may cut according to the to-be-cut boundary, thereby improving the quality and efficiency of the doctor's operation.

BRIEF DESCRIPTION OF DRAWINGS

In order to more clearly illustrate embodiments of the present disclosure or the technical solutions in the related art, the accompanying drawings required in the embodiments of the present disclosure or the related art are briefly introduced below, and the accompanying drawings in the following description are merely some embodiments recorded in the present disclosure, and for those of ordinary skill in the art, other drawings may also be obtained based on these drawings of embodiments of the present disclosure.

DETAILED DESCRIPTION

The terms used in examples of the present disclosure are intended to describe the particular examples only, and not to limit the present disclosure. The terms determined by "a", "the" and "said" in their singular forms in the present disclosure and the appended claims are also intended to include their plural forms, unless clearly indicated otherwise in the context. It should also be understood that the term "and/or" as used herein is and includes any and all possible combinations of one or more of the associated listed items.

It is to be understood that, although terms "first", "second", "third" and the like may be used in the present disclosure to describe various information, such information should not be limited to these terms. These terms are only used to distinguish information of the same category with each other. For example, without departing from the scope of the present disclosure, first information may be referred as second information; and similarly, second information may also be referred as first information. Depending on the context, the word "if" as used herein may be interpreted as "when" or "upon" or "in response to determining".

Figure 1:
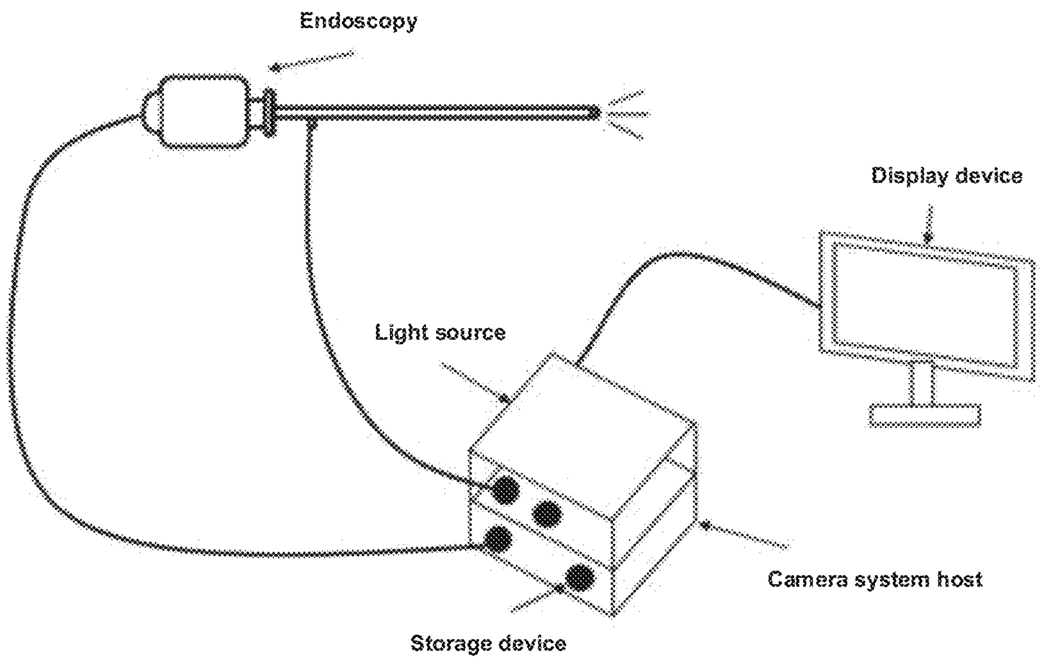
FIG. 1 is a structure diagram of an endoscope system in an embodiment of the present disclosure.

Referring to FIG. 1, which is a structure diagram of an endoscope system, the endoscope system may include: an endoscope, a light source, a camera system host, a display device and a storage device, where the display device and the storage device are external devices. The endoscope system illustrated in FIG. 1 is only an example of an endoscope system, and this structure is not limited.

For example, an endoscope may be inserted into a designated location (i.e., the location to be inspected, that is, the region inside the patient that needs to be inspected, and this designated location is not limited) inside a target object (e.g., a patient or other subjects), to collect images of the designated location inside the target object, and output the images of the designated location inside the target object to a display device and a storage device. Users (e.g., medical staff, etc.) observe the images displayed on the display device to inspect abnormal parts such as a bleeding part or a tumor part at designated locations inside the target object. Users may access images stored in the storage device to conduct postoperative reviews and surgical training, etc.

The endoscope may collect images of designated locations inside the target object and input the images to the camera system host. The light source may provide a light source for the endoscope, i.e., illumination light is emitted from the front end of the endoscope, such that the endoscope may collect relatively clear images inside the target object. After receiving an image, the camera system host may input the image to a storage device, to store the image. In subsequent processes, the user may access the image in the storage device, or access a video (a video composed of a large number of images) in the storage device. After receiving the image, the camera system host may also input the image to a display device, to display the image, and the user may observe the image displayed by the display device in real time.

Figure 2:
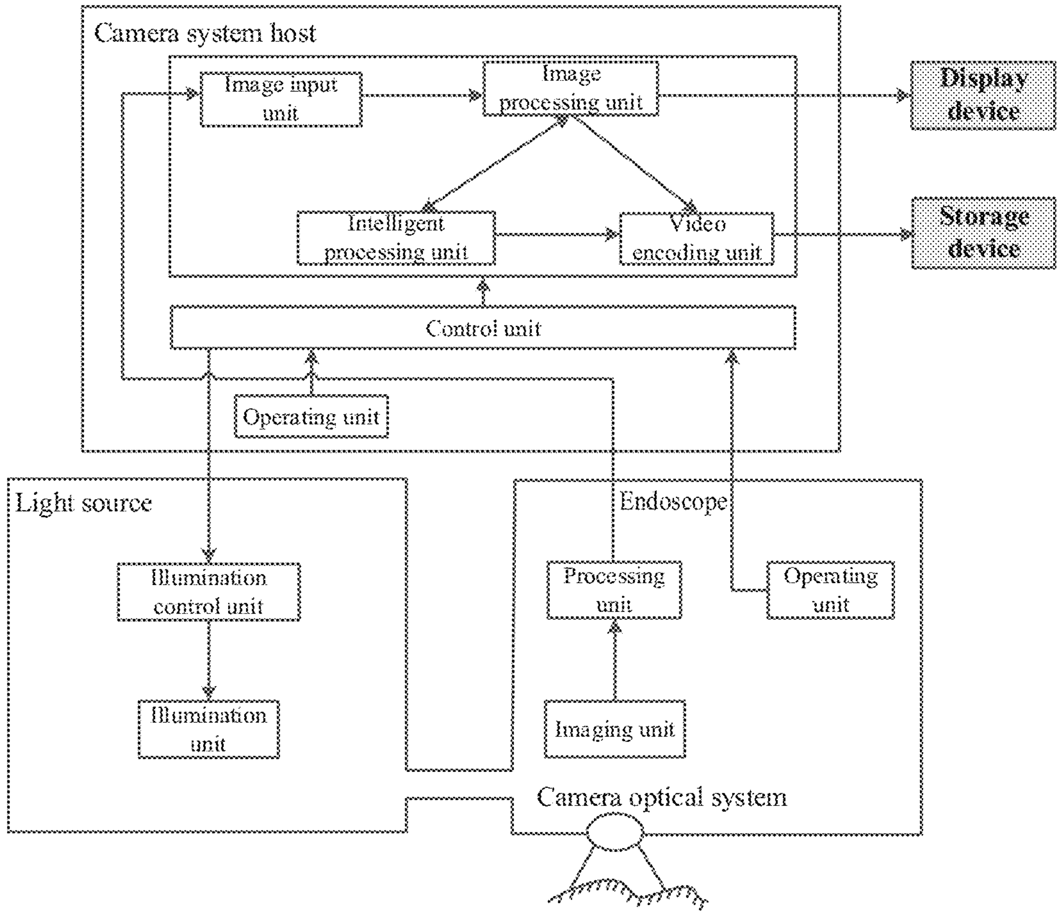
FIG. 2 is a functional structure diagram of an endoscope system in an embodiment of the present disclosure.

As illustrated in FIG. 2, which is a functional structure diagram of an endoscope system. The endoscope may include a camera optical system, an imaging unit, a processing unit, and an operating unit. The camera optical system is configured to focus light coming from an observed parts, and is composed of one or more lenses. The imaging unit is configured to perform photoelectric conversion on the light received from the camera optical system to generate image data, and is composed of sensors such as a complementary metal oxide semiconductor (CMOS) or a charge coupled device (CCD). The processing unit is configured to convert the image data into a digital signal and send the converted digital signal (e.g., the pixel value of each pixel point) to the camera system host. The operating unit may include but is not limited to a switch, a button, and a touch panel, etc., which is configured to receive an indication signal of a switching action of the endoscope, an indication signals of a switching action of the light source, etc., and output the indication signals to the camera system host.

The light source may include an illumination control unit and an illumination unit. The illumination control unit is configured to receive an indication signal from the camera system host and control the illumination unit to provide illumination light to the endoscope based on the indication signal.

The camera system host is configured to process the image data received from the endoscope and transmit the processed image data to the display device and the storage device, and the display device and the storage device are external devices of the camera system host.

The camera system host may include an image input unit, an image processing unit, an intelligent processing unit, a video encoding unit, a control unit, and an operating unit. The image input unit is configured to receive the signal sent by the endoscope and transmit the received signal to the image processing unit. The image processing unit is configured to perform image signal processing (ISP) operation on the image input by the image input unit, including but not limited to brightness conversion, sharpening, fluorescence dyeing, scaling, etc. The image processed by the image processing unit is transmitted to the intelligent processing unit, the video encoding unit, or the display device. The intelligent processing unit is configured to perform intelligent analysis on the image, including but not limited to scene classification (e.g., a thyroid surgery scene, a hepatobiliary surgery scene, and an ear-nose-throat surgery scene) based on deep learning, instrument head detection, gauze detection, and dense fog classification (dense fog classification means that the use of electric knife to cut tissue during operation will produce smoke, which will affect the field of vision. By classifying the concentration of smoke, for example, no fog type, light fog type, thick fog type, and subsequently being linked to the insufflator or defogging algorithm for defogging processing.). The image processed by the intelligent processing unit is transmitted to the image processing unit or the video encoding unit, and the image processing unit processes the image processed by the intelligent processing unit in a manner including but not limited to brightness conversion, box superimposing (box superimposing means superimposing a box pattern on the image, such as an recognition box, to mark a target recognition result, i.e., the superimposed box serves as a mark and a prompt), and scaling. The video encoding unit is configured to encode and compress the image and transmit the compressed image to the storage device. The control unit is configured to control various modules of the endoscope system, including but not limited to the illumination method of the light source, the image processing method, the intelligent processing method and the video encoding method. The operating unit may include but is not limited to a switch, a button, and a touch panel, etc., which is configured to receive an external indication signal and output the received indication signal to the control unit.

During the actual use process, it is found that, visible light images are not able to distinguish diseased tissue (such as cancerous tissue) enough, and doctors often need to judge and remove diseased tissue based on experiences, which easily causes problems such as excessive resection of normal tissue or unclean removal of diseased tissue. In order to distinguish normal tissue from diseased tissue, in a possible implementation, a white light endoscope and a fluorescence endoscope may be inserted into a designated location inside a target object, and images of the designated location inside the target object may be collected. For the convenience of distinction, the images collected by the white light endoscope are referred to as visible light images (also referred to as white light images), and the images collected by the fluorescence endoscope are referred to as fluorescence images.

By injecting fluorescent developer (such as indocyanine green (ICG)) into a designated location inside the target object in advance, the diseased tissue absorbs more fluorescent developer, and when the excitation light irradiates the diseased tissue, the fluorescent developer generates fluorescence, making the diseased tissue highlighted in the fluorescence image collected by the fluorescence endoscope. Based on the fluorescence image, normal tissue and diseased tissue may be distinguished, helping the medical staff to accurately distinguish diseased tissue.

Figure 3A:
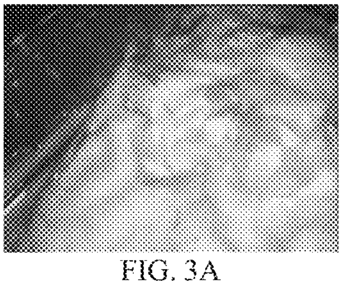
FIG. 3A is a schematic diagram of a visible light image in an embodiment of the present disclosure.
Figure 3B:
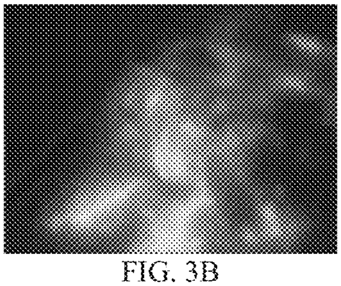
FIG. 3B is a schematic diagram of a fluorescence image in an embodiment of the present disclosure.

Visible light images may be images generated based on visible light, as illustrated in FIG. 3A, which is a schematic diagram of a visible light image of a designated location inside the target object, and the fluorescence image may be an image generated based on fluorescence, as illustrated in FIG. 3B, which is a schematic diagram of a fluorescence image of a designated location inside the target object.

In summary, it may be seen that, in the actual use of the endoscope system, visible light images and fluorescence images of the designated location inside the target object may be collected, i.e., the camera system host may obtain the visible light images and the fluorescence images. After obtaining the visible light image and the fluorescence image, a fused image may be generated based on the visible light image and the fluorescence image. The fused image can clearly show the normal tissue and the diseased tissue at the designated location inside the target object, and the normal tissue and the diseased tissue at the designated location inside the target object may be distinguished based on the fused image.

When collecting fluorescence images of a designated location inside the target object, there are a plurality of development modes, and the forms of fluorescence images collected in different development modes are different. For example, during use, the fluorescence endoscopes are divided into positive development modes (a positive development mode may also be referred to as a positive direction development mode) and negative development modes (a negative development mode may also be referred to as a negative direction development mode). In a positive development mode, the location of the diseased tissue shows fluorescence, i.e., a development region of the fluorescence image corresponds to the diseased tissue. In a negative development mode, the locations outside the diseased tissue show fluorescence, and the locations of the diseased tissue do not show fluorescence, i.e., a non-development region of the fluorescence image corresponds to the diseased tissue.

In a positive development mode, it is necessary to adopt an injection method of the fluorescent developer that matches the positive development mode, and based on the injection method of the fluorescent developer that matches the positive development mode, it is necessary to ensure that the diseased tissue is developed and the normal tissue is not developed. In a negative development mode, it is necessary to adopt an injection method of the fluorescent developer that matches the negative development mode, and based on the injection method of the fluorescent developer that matches the negative development mode, it is necessary to ensure that the diseased tissue is not developed and the normal tissue is developed.

Figure 3C:
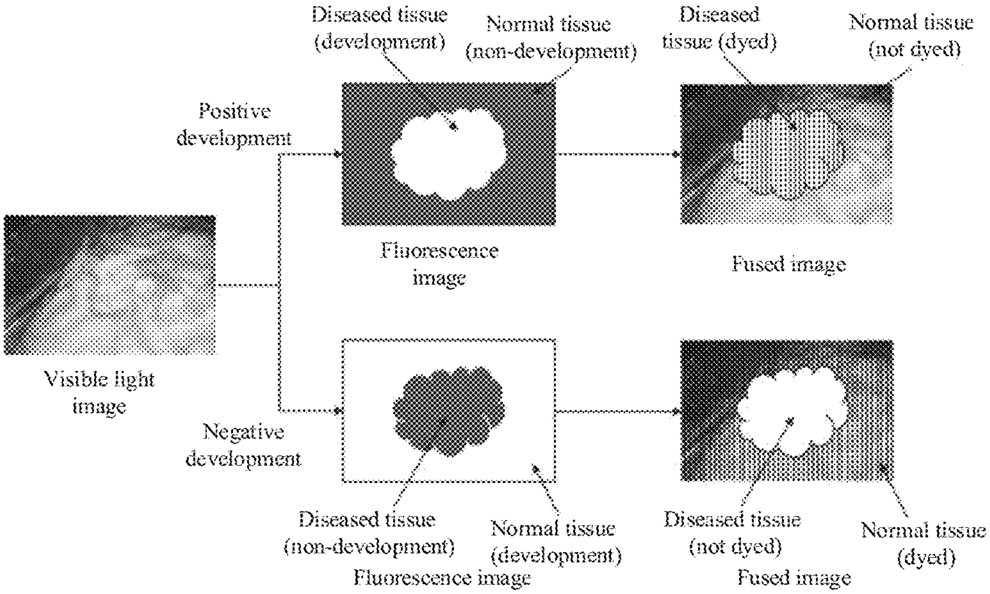
FIG. 3C is a schematic diagram of a fused image in an embodiment of the present disclosure.

As illustrated in FIG. 3C, the fluorescence image on the upper side of FIG. 3C is a fluorescence image in a positive development mode, the development region of the fluorescence image corresponds to the diseased tissue, and the non-development region of the fluorescence image corresponds to the normal tissue. By fusing the visible light image and the fluorescence image, a fused image may be obtained. In the fused image, the region corresponding to the diseased tissue is the development region, and the region corresponding to the diseased tissue may be dyed to facilitate medical staff to observe the region corresponding to the diseased tissue.

The fluorescence image on the lower side of FIG. 3C is a fluorescence image in a negative development mode, the development region of the fluorescence image corresponds to the normal tissue, and the non-development region of the fluorescence image corresponds to the diseased tissue. By fusing the visible light image and the fluorescence image, a fused image may be obtained. In the fused image, the region corresponding to the diseased tissue is the non-development region, and the region corresponding to the normal tissue is the development region and may be dyed to highlight the diseased tissue.

Since there are a plurality of development modes, e.g., a positive development mode and a negative development mode, it is possible to pre-configure which development mode is used to collect the fluorescence image. For example, it is possible to pre-configure that the fluorescence image is collected in a positive development mode, and the fluorescence image collected in the positive development mode may refer to the fluorescence image illustrated in the upper side of FIG. 3C. Alternatively, it is possible to pre-configure that the fluorescence image is collected in a negative development mode, and the fluorescence image collected in the negative development mode may refer to the fluorescence image illustrated in the lower side of FIG. 3C.

Regardless of which development mode is used to collect the fluorescence image, when a fused image is generated based on a visible light image and a fluorescence image, the fluorescence image is all superimposed on the visible light image for display, which may result in a part of the visible light image to be covered, causing certain visual obstruction, and subsequently resulting in a poor effect of the fused image and failure to clearly show the normal tissue and the diseased tissue at a designated location inside a target object, which affects the quality and efficiency of a doctor's operation.

For example, as illustrated in FIG. 3C, for a fluorescence image in a positive development mode, the development region of the fluorescence image may be superimposed on the visible light image to obtain a fused image, thereby causing the location corresponding to the development region on the visible light image to be covered, causing visual interference. For a fluorescence image in a negative development mode, the non-development region of the fluorescence image may be superimposed on the visible light image to obtain a fused image, thereby causing the location corresponding to the non-development region on the visible light image to be covered, causing visual interference In view of this, embodiments of the present disclosure provide an image processing method, which may determine the to-be-cut boundary corresponding to the diseased tissue (i.e., the to-be-cut boundary of the focus region), and superimpose the to-be-cut boundary of the focus region on the visible light image for display. so as to improve the situation of the visible light image being covered by fluorescent development, avoid or reduce visual interference, and the doctor may know the to-be-cut boundary of the focus region based on the image, and may perform cutting according to the to-be-cut boundary of the focus region (the development region in a positive development mode or the non-development region in a negative development mode), thereby improving the quality and efficiency of the doctor's operation.

The following is a description of the technical solutions of embodiments of the present disclosure in combination with specific embodiments.

Figure 4:
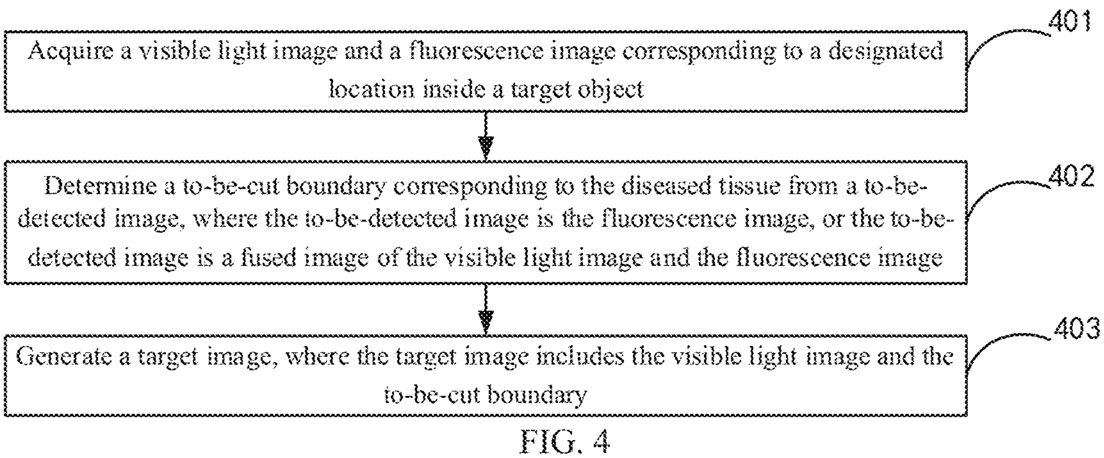
FIG. 4 is a flow diagram of an image processing method in an embodiment of the present disclosure.

Embodiments of the present disclosure provide an image processing method, the method may be applied to a camera system host, referring to FIG. 4, which is a flow diagram of the image processing method, and the method may include the following steps as described below.

At step 401, a visible light image and a fluorescence image corresponding to a designated location inside a target object are acquired. where an acquisition time of the visible light image and an acquisition time of the fluorescence image may be the same.

For example, the designated location inside the target object may include diseased tissue and normal tissue, the visible light image may include a region corresponding to the diseased tissue and a region corresponding to the normal tissue, and the fluorescence image may include a region corresponding to the diseased tissue and a region corresponding to the normal tissue.

For example, when it is necessary to collect an image of the designated location (i.e., the location to be inspected, that is, the region inside the patient that needs to be inspected) inside the target object (e.g., a patient or other subjects), an endoscope (such as a white light endoscope and a fluorescence endoscope) may be inserted into the designated location inside the target object, the white light endoscope collects a visible light image of the designated location inside the target object, and the fluorescence endoscope collects a fluorescence image of the designated location inside the target object, and the camera system host may obtain the visible light image from the white light endoscope and the fluorescence image from the fluorescence endoscope. FIG. 3A is a schematic diagram of a visible light image of a designated location inside a target object, and FIG. 3B is a schematic diagram of a fluorescence image of a designated location inside a target object.

For example, the development mode may be a positive development mode or a negative development mode. If the development mode is a positive development mode, when a fluorescence image corresponding to the designated location inside the target object is acquired, the fluorescence image is a fluorescence image corresponding to the positive development mode, i.e., the development region of the fluorescence image corresponds to the diseased tissue, and the non-development region of the fluorescence image corresponds to the normal tissue. If the development mode is a negative development mode, when a fluorescence image corresponding to the designated location inside the target object is acquired, the fluorescence image is a fluorescence image corresponding to the negative development mode, i.e., the development region of the fluorescence image corresponds to normal tissue, and the non-development region of the fluorescence image corresponds to diseased tissue.

For example, when the visible light image and the fluorescence image corresponding to a designated location inside the target object are acquired, since there may be diseased tissue and normal tissue at the designated location inside the target object, when the visible light image of the designated location inside the target object is acquired by the white light endoscope, the visible light image may include a region corresponding to normal tissue and a region corresponding to diseased tissue When a fluorescence image of the designated location inside the target object is acquired by the fluorescence endoscope, the fluorescence image may include a region corresponding to normal tissue and a region corresponding to diseased tissue.

In summary, the visible light image and the fluorescence image corresponding to the designated location inside the target object may be obtained, the visible light image may include a region corresponding to the diseased tissue and a region corresponding to the normal tissue, and the fluorescence image may include a region corresponding to the diseased tissue and a region corresponding to the normal tissue.

At step 402, a to-be-cut boundary corresponding to the diseased tissue is determined from a to-be-detected image, where the to-be-detected image is the fluorescence image, or the to-be-detected image is a fused image of the visible light image and the fluorescence image.

In a possible implementation, the following steps may be used to determine the to-be-cut boundary as described below.

At step 4021: a target region corresponding to the diseased tissue is determined from the to-be-detected image, where the target region may be a region in the to-be-detected image, and the target region in the to-be-detected image corresponds to the diseased tissue.

For example, the to-be-detected image may be a fluorescence image, in which case the target region corresponding to the diseased tissue is determined from the fluorescence image, and the target region is the region corresponding to the diseased tissue in the fluorescence image. Alternatively, the to-be-detected image may be the fused image of the visible light image and the fluorescence image, in which case the fused image is generated based on the visible light image and the fluorescence image, and the target region corresponding to the diseased tissue is determined from the fused image, and the target region is the region corresponding to the diseased tissue in the fused image.

When generating the fused image based on the visible light image and the fluorescence image, the following methods may be included but not limited to performing contrast enhancement of the fluorescence image to enhance the contrast of the fluorescence image to obtain a contrast-enhanced fluorescence image. The contrast enhancement method may include but is not limited to histogram equalization, local contrast enhancement, etc., and the contrast enhancement method is not limited. Then, color mapping is performed on the contrast-enhanced fluorescence image, i.e., the fluorescence image is dyed to obtain a color-mapped fluorescence image. When the fluorescence image is dyed, different fluorescent brightness in the fluorescence image may correspond to different hues and saturations, and the color mapping method is not limited. Then, the color-mapped fluorescence image and the visible light image are fused to obtain the fused image (i.e., the dyed visible light image). For example, the color-mapped fluorescence image may be superimposed on the visible light image for display, thereby obtaining the fused image, i.e., the visible light image is dyed based on the fluorescence image, and then achieving the effect of displaying the development region of the fluorescence image on the visible light image.

The above method is only an example of generating a fused image, and the generating method is not limited. FIG. 3C illustrates an example of generating a fused image based on a visible light image and a fluorescence image.

In the embodiments, the fluorescence image may be used as the to-be-detected image, and the target region corresponding to the diseased tissue is determined from the to-be-detected image; or, the fused image may be generated based on the visible light image and the fluorescence image, and the fused image may be used as the to-be-detected image, and the target region corresponding to the diseased tissue is determined from the to-be-detected image.

In a possible implementation, after the to-be-detected image is obtained, the following steps may be used to determine the target region corresponding to the diseased tissue from the to-be-detected image. The following steps are only examples, and the determining method is not limited, as long as the target region corresponding to the diseased tissue can be obtained.

At step 40211: based on a pixel value corresponding to each pixel point in the to-be-detected image respectively, target pixel points corresponding to the diseased tissue are selected from all pixel points in the to-be-detected image.

For example, for the to-be-detected image, based on a feature of the to-be-detected image, it may be known that the brightness of the development region of the to-be-detected image (e.g., the development region of the fluorescence image or the fused image) is relatively large, and the brightness of the non-development region of the to-be-detected image is relatively small, therefore, based on a pixel value corresponding to each pixel in the fluorescence image respectively, the target pixels corresponding to the diseased tissue may be selected. For example, in the positive development mode, the diseased tissue corresponds to the development region, and the normal tissue corresponds to the non-development region, i.e., the brightness value corresponding to the diseased tissue is relatively large, and the brightness value corresponding to the normal tissue is relatively small. Therefore, the pixel points with large brightness values may be used as the target pixel points. In the negative development mode, the diseased tissue corresponds to the non-development region, and the normal tissue corresponds to the development region, i.e., the brightness value corresponding to the diseased tissue is relatively small, and the brightness value corresponding to the normal tissue is relatively large. Therefore, the pixel points with small brightness values may be used as the target pixel points. Based on the above principles, in order to select the target pixel points corresponding to the diseased tissue, the following methods may be used in the embodiments as described below.

Method 1, if the fluorescence image is a fluorescence image in a positive development mode, i.e., a fluorescence image acquired in the positive development mode, where in the positive development mode, the development region of the fluorescence image corresponds to the diseased tissue, then, for each pixel point in the to-be-detected image (i.e., the fluorescence image or the fused image), if the pixel value (e.g., brightness value) corresponding to the pixel point is larger than the first threshold, determining that the pixel point is a target pixel point; if the pixel value corresponding to the pixel point is smaller than or equal to the first threshold, determining that the pixel point is not a target pixel point.

After the above processing is performed on all pixels in the to-be-detected image, target pixels may be selected from all pixels in the to-be-detected image, and there may be a plurality of target pixels. In summary, it may be seen that the target pixel points are the pixel points in the to-be-detected image whose pixel value is greater than the first threshold.

For example, a target pixel in the to-be-detected image may be determined by using a binarization method, and binarization is to set the pixel value of the pixel on the image to 0 or 255. For example, the value range of the pixel value is 0-255, and an appropriate binarization threshold may be set. If the pixel value of the pixel is larger than the binarization threshold, the pixel value of the pixel is set to 255. If the pixel value of the pixel is smaller than or equal to the binarization threshold, the pixel value of the pixel is set to 0. Therefore, a binarized image is obtained, and the pixel values of pixels in the binarized image are 0 or 255.

Based on the above principle, a threshold may be pre-configured as the first threshold. The first threshold may be configured based on experiences and is not limited. Based on the first threshold, the boundary between the development region and the non-development region may be represented, and the development region and the non-development region in the to-be-detected image may be distinguished based on the first threshold. Based on this, since the brightness value corresponding to the diseased tissue is relatively large and the brightness value corresponding to the normal tissue is relatively small, the pixel point with a large brightness value may be used as a target pixel point. Therefore, for each pixel point in the to-be-detected image, if the pixel value corresponding to the pixel point is larger than the first threshold, it may be determined that the pixel point is the target pixel point. and if the pixel value corresponding to the pixel point is smaller than or equal to the first threshold, it may be determined that the pixel point is not a target pixel point.

In the above embodiment, for each pixel point in the to-be-detected image, the pixel value corresponding to the pixel point may be the pixel value of the pixel point itself, or the local pixel mean value corresponding to the pixel point. For example, a sub-block centered on the pixel point is obtained, and the sub-block includes M number of pixel points, where M is a positive integer, and an average value of pixel values of the M number of pixel points is used as the local pixel mean value corresponding to the pixel point.

Method 2, if the fluorescence image is a fluorescence image in a negative development mode, i.e., a fluorescence image acquired in the negative development mode, where in the negative development mode, the non-development region of the fluorescence image corresponds to the diseased tissue, then, for each pixel point in the to-be-detected image (i.e., the fluorescence image or the fused image), if the pixel value (e.g., brightness value) corresponding to the pixel point is smaller than the second threshold, determining that the pixel point is a target pixel point; if the pixel value corresponding to the pixel point is larger than or equal to the second threshold, determining that the pixel point is not a target pixel point. After the above processing is performed on all pixels in the to-be-detected image, target pixels may be selected from all pixels in the to-be-detected image, i.e., the pixel points whose pixel value in the to-be-detected image is smaller than the second threshold.

For example, a threshold may be pre-configured as the second threshold. The second threshold may be configured based on experiences and is not limited. Based on the second threshold, the boundary between the development region and the non-development region may be represented, and the development region and the non-development region in the to-be-detected image may be distinguished based on the second threshold. Based on this, since the brightness value corresponding to the diseased tissue is relatively small and the brightness value corresponding to the normal tissue is relatively large, the pixel point with a small brightness value may be used as a target pixel point. Therefore, for each pixel point in the to-be-detected image, if the pixel value corresponding to the pixel point is smaller than the second threshold, it may be determined that the pixel point is the target pixel point, and if the pixel value corresponding to the pixel point is larger than or equal to the second threshold, it may be determined that the pixel point is not a target pixel point.

In the above embodiment, for each pixel point in the to-be-detected image, the pixel value corresponding to the pixel point may be the pixel value of the pixel point itself, or may be the local pixel mean value corresponding to the pixel point.

Method 3, the to-be-detected image is input to a trained target segmentation model, such that the target segmentation model determines, based on a pixel value corresponding to each pixel point in the to-be-detected image respectively, a predicted label value corresponding to each pixel point in the to-be-detected image respectively, where the predicted label value corresponding to each pixel point in the to-be-detected image is the first value or the second value, the first value is configured to indicate that the pixel point is a pixel point corresponding to the diseased tissue, and the second value is configured to indicate that the pixel point is not a pixel point corresponding to the diseased tissue. The pixel point with the predicted label value of the first value is determined as the target pixel point.

For example, in method 3, a machine learning algorithm may be used to train a target segmentation model, and the target segmentation model may be used to implement segmentation of the focus region (i.e., the target region corresponding to the diseased tissue), i.e., to distinguish the target pixel points corresponding to the diseased tissue from all the pixel points in the to-be-detected image.

Figure 5A:
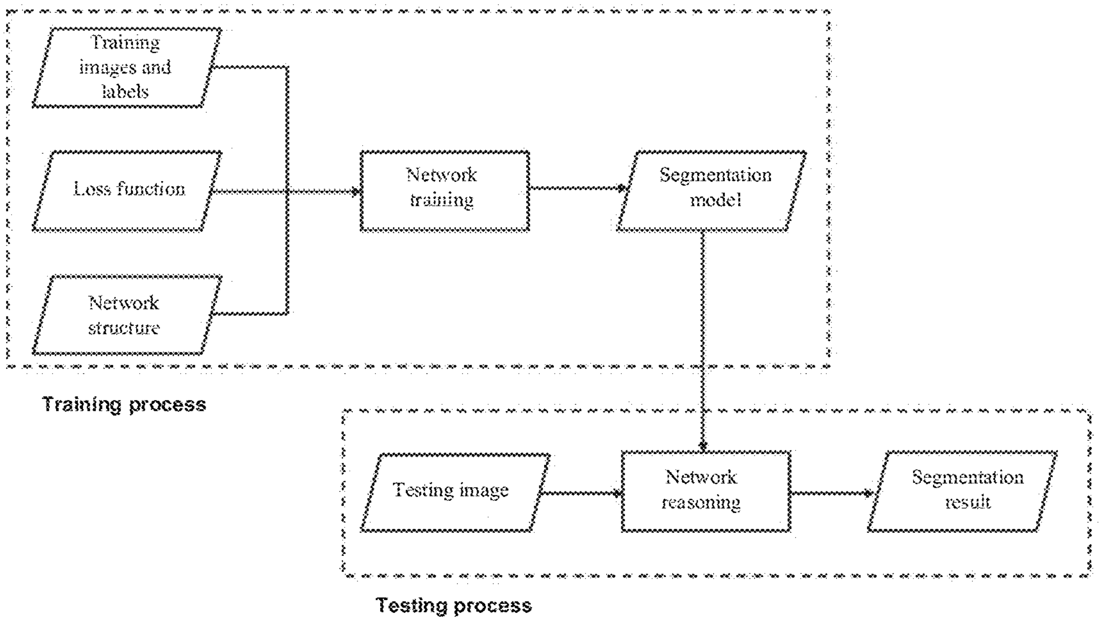
FIG. 5A is a schematic diagram of training and testing based on a target segmentation model in an embodiment of the present disclosure.

FIG. 5A relates to the training process and the testing process of the target segmentation model. In the training process, the network training is performed based on the sample image, calibration information, a loss function and a network structure, to obtain the target segmentation model. In the testing process, the testing image (i.e., the to-be-detected image) may be input to the trained target segmentation model, and the target segmentation model performs network reasoning on the to-be-detected image to obtain the segmentation result corresponding to the to-be-detected image, i.e., to distinguish the target pixel points corresponding to the diseased tissue from the to-be-detected image.

In a possible implementation, the training process and the testing process may include the following steps as described below.

At step S11, an initial segmentation model is obtained, which may be a machine learning model, such as a deep learning model or a neural network model, etc., and the type of the initial segmentation model is not limited. The initial segmentation model may be a classification model, which is configured to output a predicted label value corresponding to each pixel in the image respectively, where the predicted label value is the first value or the second value, i.e., the output of the initial segmentation model corresponds to two categories, the first value is configured to indicate that the pixel point corresponds to the diseased tissue, and the second value is configured to indicate that the pixel point does not correspond to the diseased tissue, and the structure of the initial segmentation model is not limited, as long as the initial segmentation model may implement the above functions.

Figure 5B:
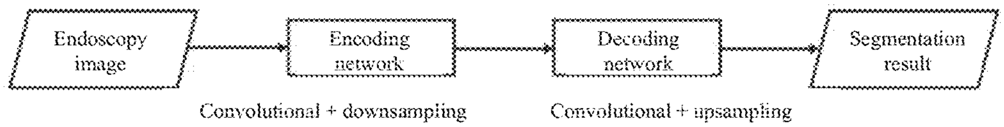
FIG. 5B is a network structure diagram of a segmentation model in an embodiment of the present disclosure.

For example, the network structure of the initial segmentation model may refer to FIG. 5B, which may include an input layer (for receiving an input image), an encoding network, a decoding network, and an output layer (for outputting a segmentation result). The encoding network includes a convolutional layer and a downsampling layer, and the decoding network includes a convolutional layer and an upsampling layer, and the network structure of the initial segmentation model is not limited, e.g., a unet network model is used as the initial segmentation model.

At step S12, a sample image and calibration information corresponding to the sample image are obtained, the calibration information includes a calibration label value corresponding to each pixel in the sample image respectively. If the pixel point is a pixel point corresponding to diseased tissue, a calibration label value corresponding to the pixel point is the first value (e.g., 1, etc.) to indicate that the pixel point corresponds to the diseased tissue. If the pixel point is not a pixel point corresponding to diseased tissue, a calibration label value corresponding to the pixel point is the second value (e.g., 0, etc.) to indicate that the pixel point does not correspond to the diseased tissue.

A large number of sample images may be acquired, each sample image is a fluorescence image or a fusion image inside the target object, and the sample image may also be referred to as a training image. For each sample image, the user may manually calibrate the calibration information corresponding to the sample image. For example, the focus region (i.e., the region corresponding to the diseased tissue) needs to be marked (i.e., the contour of the focus region is marked), a calibration mask diagram may be output after marking, and the calibration mask diagram is the calibration information corresponding to the sample image, in the calibration mask diagram, the values of the outline of the focus region are all the first value, and the values inside the contour are all the first value, indicating that the contour and the inside of the contour are all pixel points corresponding to the diseased tissue. The values outside the contour are all the second value, indicating that the outside of the contour is not the pixel points corresponding to the diseased tissue.

Figure 5C:
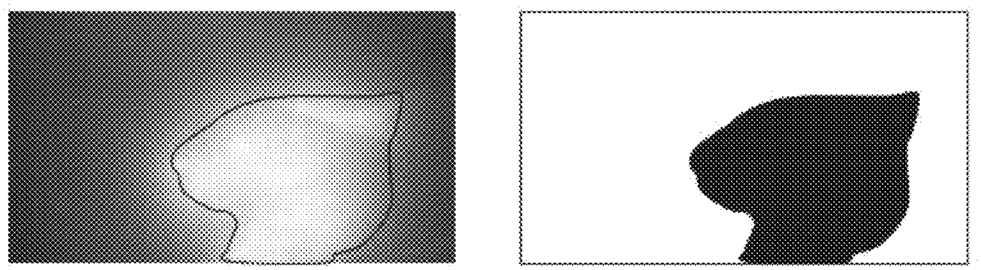
FIG. 5C is a schematic diagram of a sample image and a calibration mask in an embodiment of the present disclosure.

Referring to FIG. 5C, the image on the left may be a sample image (e.g., a fluorescence image), and the image on the right may be a calibration mask diagram corresponding to the sample image, i.e., the calibration information corresponding to the sample image, where the black pixel points are all pixel points corresponding to the diseased tissue, and all white pixel points are not pixel points corresponding to the diseased tissue.

In summary, for each sample image, the sample image and the calibration information corresponding to the sample image may be obtained, and the calibration information corresponding to the sample image may be a calibration mask diagram.

At step S13, the sample image is input to an initial segmentation model, such that the initial segmentation model determines, based on a pixel value corresponding to each pixel point in the sample image respectively, a predicted label value and a predicted probability corresponding to the predicted label value that correspond to each pixel point respectively, where the predicted label value corresponding to the pixel point in the sample image may be the first value or the second value.

For example, since the brightness of the development region of the sample image (e.g., the fluorescence image) is relatively large, and the brightness of the non-development region is relatively small, the working principle of the initial segmentation model is to determine the segmentation result of the sample image based on a pixel value corresponding to each pixel point in the sample image respectively, and the working process of the initial segmentation model is not limited, as long as the initial segmentation model can output the segmentation result. In summary, after the sample image is input to the initial segmentation model, the initial segmentation model may determine, based on a pixel value corresponding to each pixel point in the sample image respectively, a predicted label value and a predicted probability corresponding to the predicted label value that correspond to each pixel point respectively, e.g., the first pixel point corresponds to the first value and the predicted probability of the pixel point corresponding to the first value is 0.8, the second pixel point corresponds to the first value and the predicted probability of the pixel point corresponding to the first value is 0.6, the third pixel point corresponds to the second value and the predicted probability of the pixel point corresponding to the second value is 0.8, and so on.

At step S14, a target loss value is determined based on the calibration label value and the predicted label value corresponding to each pixel point. For example, for each pixel point, the target loss value is determined based on the calibration label value corresponding to the pixel point, the predicted label value corresponding to the pixel point and the predicted probability corresponding to the predicted label value.

For example, assuming that the loss function is a cross entropy loss function, the loss value may be determined by using the following formula. The cross entropy loss function is only an example, and the type of the loss function is not limited.

$$\text{loss} = -\sum_{c=1}^{M} y_c \log(p_c)$$

In the above formula, for each pixel point. loss represents the loss value corresponding to the pixel point, M represents the number of categories, which is 2 in this embodiment, i.e., there are two categories in total, category 1 corresponds to the first value, and category 2 corresponds to the second value. $y_c$ is the value corresponding to the calibration label value, which may be equal to 0 or 1. If the calibration label value corresponding to the pixel point is the first value, $y_1$ is 1, and $y_2$ is 0. If the calibration label value corresponding to the pixel point is the second value, $y_1$ is 0, and $y_2$ is 1. $p_c$ is the predicted probability corresponding to the predicted label value. If the probability of the first value corresponding to the pixel point is p_1, the probability of the second value corresponding to the pixel point is 1-p_1.

In summary, for each pixel in the sample image, the above formula may be used to calculate the loss value corresponding to the pixel point, and then the target loss value may be determined based on the loss values corresponding to all pixel points in the sample image. For example, the target loss value may be determined based on the arithmetic average of the sum of the loss values corresponding to all pixel points.

At step S15, the initial segmentation model is trained based on the target loss value to obtain a target segmentation model.

For example, the network parameters of the initial segmentation model are adjusted based on the target loss value to obtain an adjusted segmentation model, and the goal of adjusting the network parameters is to make the target loss value smaller and smaller. After obtaining the adjusted segmentation model, the adjusted segmentation model is used as the initial segmentation model, and steps S13-S14 are re-executed until the target loss value meets an optimization goal, and the adjusted segmentation model is used as the target segmentation model.

At this point, the target segmentation model is obtained through training, and the testing process is performed based on the target segmentation model.

At step S16, during the testing process, after obtaining the to-be-detected image, the to-be-detected image may be input to the target segmentation model (the working principle of the target segmentation model refers to the working principle of the above initial segmentation model), such that the target segmentation model determines a predicted label value corresponding to each pixel point respectively, based on a pixel value corresponding to each pixel point in the to-be-detected image respectively. If the predicted label value corresponding to the pixel point is the first value, it is determined that the pixel point is the pixel point corresponding to the diseased tissue, i.e., the pixel point is a target pixel point. If the predicted label value corresponding to the pixel point is the second value, it is determined that the pixel point is not the pixel point corresponding to the diseased tissue, i.e., the pixel point is not a target pixel point. In summary, the pixel point whose predicted label value is the first value may be determined as the target pixel point, so as to find all target pixel points corresponding to the diseased tissue from the to-be-detected image.

In summary, it may be seen that based on method 1, method 2, or method 3, the target pixel points corresponding to the diseased tissue may be selected from all the pixel points of the to-be-detected image, and the selection method is not limited.

At step 40212, at least one connected component composed of all target pixel points in the to-be-detected image is acquired.

For example, after the target pixel points are determined from the to-be-detected image, a connected region detection algorithm may be used to determine the connected component composed of these target pixel points (i.e., the connected region of the target pixel points). There may be at least one connected component, and the process of determining the connected components is not limited.

The region composed of adjacent target pixel points is referred to as a connected component. The connected region detection algorithm refers to finding and marking each connected component in the to-be-detected image, that is to say, based on the connected region detection algorithm, each connected component in the to-be-detected image may be found, and the process is not limited.

At step 40213, a target region corresponding to the diseased tissue is determined from the to-be-detected image based on a connected component.

For example, there may be at least one connected component. If the number of connected domains is one, the connected component is used as the target region corresponding to the diseased tissue in the to-be-detected image. If the number of connected components is at least two, the connected component with the largest region is used as the target region corresponding to the diseased tissue in the to-be-detected image, other connected components may also be used as the target region, a plurality of adjacent connected components may also be used as the target regions corresponding to the diseased tissue in the to-be-detected image, or all the connected components may be used as the target regions corresponding to the diseased tissue in the to-be-detected image, which is not limited.

In a possible implementation, after obtaining the connected component composed of target pixel points, the connected component may also be subjected to morphological processing (e.g., using a 9*9 filter kernel to smooth the connected component to obtain a connected component with smooth edges) and interference removal processing (e.g., removing isolated points), to obtain a connected component after morphological processing and interference removal processing, such that the target region corresponding to the diseased tissue is determined from the to-be-detected image, based on the connected component after morphological processing and interference removal processing.

In summary, based on step 40211 to step 40213, the target region corresponding to the diseased tissue may be obtained, and at this point, step 4021 is completed, and the subsequent step 4022 is performed based on the target region.

At step 4022, a region contour corresponding to the diseased tissue is determined based on the target region corresponding to the diseased tissue. For example, all boundary pixel points in the target region are determined, and the region contour corresponding to the diseased tissue is determined based on all boundary pixel points in the target region, i.e., all boundary pixel points constitute the region contour.

At step 4023, the to-be-cut boundary corresponding to the diseased tissue is determined based on the region contour.

In a possible implementation, after the region contour corresponding to the diseased tissue is obtained, the region contour may be directly determined as the to-be-cut boundary, indicating that cutting needs to be performed along the region contour. The region contour may be an irregular shape or any shape, and the region contour is not limited.

In another possible implementation, after the region contour corresponding to the diseased tissue is obtained, it may also be determined whether there is a coincident boundary between the region contour and the organ contour of the organ corresponding to the diseased tissue. If there is no coincident boundary between the region contour and the organ contour, the region contour is determined as the to-be-cut boundary, indicating that cutting needs to be performed along the region contour. If there is a coincident boundary between the region contour and the organ contour, a non-coincident boundary (i.e., the remaining boundary in the region contour except the coincident boundary) between the region contour and the organ contour is determined as the to-be-cut boundary.

In this embodiment, the organ contour of the organ corresponding to the diseased tissue may be acquired first, and the acquisition method is not limited in the embodiment, as long as the organ contour of the organ corresponding to the diseased tissue can be obtained. For example, a deep learning model for recognizing an organ contour may be pre-trained, and the training process of the deep learning model is not limited. On this basis, the above visible light image may be input to the deep learning model, and the deep learning model outputs the organ contour of the organ corresponding to the diseased tissue, and the working principle of this deep learning model is not limited, as long as the deep learning model can output the organ contour.

After the region contour corresponding to the diseased tissue and the organ contour corresponding to the diseased tissue are obtained, it may be determined whether there is a coincident boundary between the region contour and the organ contour, i.e., whether there is a coincident line segment.

If there is no coincident boundary, it means that cutting needs to be performed along the region contour in order to completely cut the diseased tissue. Therefore, the region contour may be determined as the to-be-cut boundary.

If there is a coincident boundary, it means that the edge of the organ is already diseased tissue For example, the entire left side (or right side, or upper side, or lower side, etc.) of the organ corresponding to the diseased tissue is already diseased tissue, and the region contour will coincide with the left edge of the organ corresponding to the diseased tissue. In this case, the diseased tissue may be completely cut by cutting only along the non-coincident boundary. Therefore, the non-coincident boundary between the region contour and the organ contour is determined as the to-be-cut boundary. The coincident boundary between the region contour and the organ contour is the edge of the organ corresponding to the diseased tissue. When cutting along the non-coincident boundary, the region corresponding to the coincident boundary is also cut.

In summary, the to-be-cut boundary may be determined. The above are just two examples, and the determining method is not limited, as long as the diseased tissue can be completely cut based on the to-be-cut boundary.

At this point, step 402 is completed, the to-be-cut boundary is obtained, and the subsequent step 403 is performed based on the to-be-cut boundary.

At step 403, a target image is generated, where the target image includes the visible light image and the to-be-cut boundary.

In a possible implementation, after the to-be-cut boundary corresponding to the diseased tissue is determined from the to-be-detected image, the to-be-cut boundary may be superimposed on the visible light image to obtain the target image, the target image includes the visible light image and the to-be-cut boundary, and the location of the to-be-cut boundary on the visible light image is the same as the location of the to-be-cut boundary on the to-be-detected image.

After the target image is obtained, the target image may be displayed on the screen for medical staff to view. Since the to-be-cut boundary is the boundary of the focus region, medical staff may clearly see the boundary of the focus region from the target image, and the boundary of the focus region may provide a reference for cutting.

In another possible implementation, in order to more prominently display the to-be-cut boundary in the target image, generating the target image based on the visible light image and the to-be-cut boundary may include the following steps as described below.

At step 4031, a target boundary feature corresponding to the to-be-cut boundary is determined.

For example, the target boundary feature may include but is not limited to a target color and/or a target line type, and the target boundary feature is not limited, which may be any feature used to display the to-be-cut boundary.

The target color may be any color, such as blue, red, green, etc., and the target color is not limited, as long as the target color is different from the color of the target image itself and can highlight the to-be-cut boundary.

The target line type may be any line type, such as a solid line type and a dashed line type, etc. and the target line type is not limited, as long as the target line type may highlight the to-be-cut boundary.

At step 4032, a target cut boundary is generated based on the to-be-cut boundary and the target boundary feature.

For example, if the target boundary feature is a target color, performing color adjustment on the to-be-cut boundary, to obtain the target cut boundary, and the color of the target cut boundary is the target color. For example, if the target color is blue, the color of the to-be-cut boundary is adjusted to blue, to obtain a blue target cut boundary.

If the target boundary feature is a target line type, performing line type adjustment on the to-be-cut boundary, to obtain the target cut boundary, and the line type of the target cut boundary is the target line type. For example, if the target line type is a dashed line type, the line type of the to-be-cut boundary is adjusted to a dashed line type, to obtain a dashed target cut boundary.

If the target boundary feature is a target color and a target line type, performing color adjustment and line type adjustment on the to-be-cut boundary, to obtain the target cut boundary, and the color of the target cut boundary is the target color, and the line type of the target cut boundary is the target line type. For example, if the target color is blue and the target line type is a dashed line type, the color of the to-be-cut boundary is adjusted to blue and the line type of the to-be-cut boundary is adjusted to the dashed line type, to obtain a target cut boundary with the blue color and the dashed line type.

The above are just a few examples of generating target cut boundaries, which is not limited.

At step 4033, the to-be-cut boundary is superimposed on the visible light image to obtain the target image.

For example, the target cut boundary may be superimposed on the visible light image to obtain the target image, which includes the visible light image and the target cut boundary. After the target image is obtained, the target image may be displayed on the screen for the medical staff to view. Since the target cut boundary is the boundary of the focus region, and the target cut boundary is a highlighted boundary, e.g., the target cut boundary is highlighted as a boundary with a target color and/or a target line type, the medical staff may clearly see the boundary of the focus region from the target image.

In a possible implementation, in order to more prominently display the to-be-cut boundary and the information around the to-be-cut boundary in the target image, after the target image is generated based on the visible light image and the to-be-cut boundary, if the fluorescence image is a fluorescence image in a positive development mode, and the fluorescence image includes a development region outside the to-be-cut boundary, the development region outside the to-be-cut boundary is superimposed on the target image, i.e., the low-intensity fluorescent development region outside the to-be-cut boundary is retained on the target image. If the fluorescence image is a fluorescence image in a negative development mode, and the fluorescence image includes a development region inside the to-be-cut boundary, the development region inside the to-be-cut boundary is superimposed on the target image, i.e., the low-intensity fluorescent development region inside the to-be-cut boundary is retained on the target image.

For example, if the fluorescence image is a fluorescence image in a positive development mode, the development region of the fluorescence image corresponds to the diseased tissue, and the to-be-cut boundary is the boundary of the target region corresponding to the diseased tissue. The inside of the to-be-cut boundary is the development region. After the to-be-cut boundary is superimposed on the visible light image to obtain the target image, the development region inside the to-be-cut boundary is not superimposed on the target image. For the fluorescence image, there may also be a development region outside the to-be-cut boundary, but an intensity of the development region outside the to-be-cut boundary is lower than an intensity of the development region inside the to-be-cut boundary. After the to-be-cut boundary is superimposed on the visible light image to obtain the target image, the development region outside the to-be-cut boundary may not be superimposed on the target image, or the development region outside the to-be-cut boundary may be superimposed on the target image, i.e., the development region is expanded from the to-be-cut boundary to the outer periphery, and the low-intensity fluorescence development region outside the to-be-cut boundary in the fluorescence image is retained in the target image.

If the fluorescence image is a fluorescence image in a negative development mode, the development region of the fluorescence image corresponds to normal tissue, the non-development region corresponds to the diseased tissue, and the to-be-cut boundary is the boundary of the diseased tissue corresponding to the target region. The outside of the to-be-cut boundary is the development region. After the to-be-cut boundary is superimposed on the visible light image to obtain the target image, the development region outside the to-be-cut boundary is not superimposed on the target image. For the fluorescence image, there may also be a development region inside the to-be-cut boundary, but the intensity of the development region inside the to-be-cut boundary is lower than the intensity of the development region outside the to-be-cut boundary. After the to-be-cut boundary is superimposed on the visible light image to obtain the target image, the development region inside the to-be-cut boundary may not be superimposed on the target image, or the development region inside the to-be-cut boundary may be superimposed on the target image, i.e., the development region is expanded from the to-be-cut boundary to the inner periphery, and the low-intensity fluorescence development region inside the to-be-cut boundary in the fluorescence image is retained in the target image.

Figure 5D:
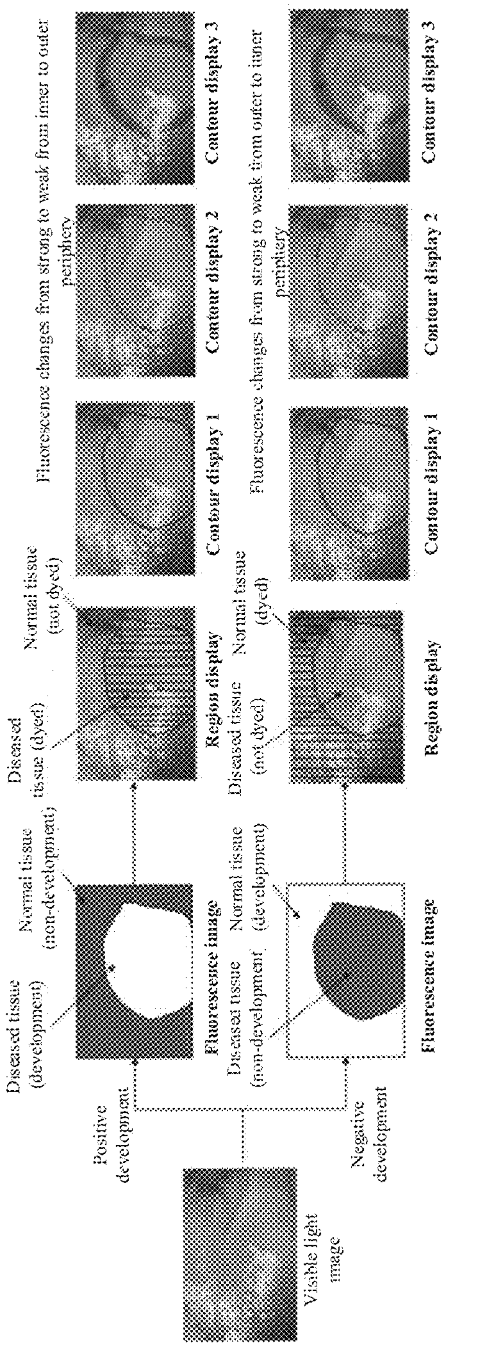
FIG. 5D is a schematic diagram of a target image in an embodiment of the present disclosure.

The above process is described below in combination with FIG. 5D. For the convenience of description, in FIG. 5D, taking the to-be-cut boundary being a region contour as an example. Referring to FIG. 5D, the image on the left is a visible light image. For the five images on the upper side, the first image is a fluorescence image in the positive development mode. The second image is a fused image of the fluorescence image and the visible light image, and the fused image displays the development region of the fluorescence image (i.e., the development region of the fluorescence image is superimposed on the visible light image), instead of displaying the region contour. The third image is the target image under contour display 1, and the target image displays the first region contour, i.e., the first region contour is superimposed on the visible light image to obtain the target image, and the contour display 1 indicates that the color of the first region contour is the target color (the target color is not illustrated in FIG. 5D), and the line type of the first region contour is a solid line type. The fourth image is the target image under contour display 2, and the target image displays the second region contour, and the contour display 2 indicates that the color of the second region contour is the target color, and the line type of the second region contour is a dashed line type. The fifth image is the target image under contour display 3, and the target image displays the third region contour, and the target image displays a low-intensity fluorescence development region outside the third region contour.

For the five images on the lower side of FIG. 5D, the first image is a fluorescence image in a negative development mode. The second image is a fused image of the fluorescence image and the visible light image. The third image is the target image under contour display 1, the target image displays the fourth region contour, the contour display 1 indicates that the color of the fourth region contour is the target color, and the line type of the fourth region contour is a solid line type. The fourth image is the target image under contour display 2, and the target image displays the fifth region contour, contour display 2 indicates that the color of the fifth region contour is the target color, and the line type of the fifth region contour is a dashed line type. The fifth image is the target image under contour display 3, and the target image displays the sixth region contour, and the target image displays a low-intensity fluorescence development region inside the sixth region contour.

The target image display methods in FIG. 5D are just a few examples, and the display methods are not limited.

In a possible implementation, regarding the triggering timing of step 401 to step 403, if a display switching command for the fluorescence image is received, and the display switching command is configured to indicate the display of the to-be-cut boundary, then step 401 to step 403 may be executed, that is to say, the to-be-cut boundary corresponding to the diseased tissue is determined from the to-be-detected image, and the to-be-cut boundary is superimposed on the visible light image to obtain the target image, and the target image is displayed. If the display switching command for the fluorescence image is not received, a fused image may be generated based on the visible light image and the fluorescence image, and the fused image may be displayed, and the embodiments will not repeat the process.

When the operation on the target object enters the resection stage, the medical staff may issue a display switching command for the fluorescence image, such that the display switching command for the fluorescence image may be received, and then the image processing method of the embodiments is adopted to superimpose the to-be-cut boundary on the visible light image.

It can be seen from the above technical solution that in embodiments of the present disclosure, the to-be-cut boundary corresponding to the diseased tissue (i.e., the boundary of the focus region) may be determined, and a target image is generated based on the visible light image and the to-be-cut boundary, i.e., the to-be-cut boundary is superimposed on the visible light image for display. Since the to-be-cut boundary is superimposed on the visible light image for display instead of superimposing the fluorescent image on the visible light image for display, the problem of most parts of the visible light images being covered is avoided, the situation of visible light images being covered by fluorescent development is improved, and visual obstructions are avoided or alleviated. The effect of the target image is better, which can clearly display the normal tissue and diseased tissue at the designated location inside the target object, improving the quality and efficiency of the doctor's operation and providing a better user experience. Since the to-be-cut boundary is displayed on the target image, the doctor may know the to-be-cut boundary corresponding to the diseased tissue, and may cut according to the to-be-cut boundary, improving the quality and efficiency of the doctor's operation.

The image processing method of the embodiments of the present disclosure is described below in combination with specific application scenarios.

Figure 6A:
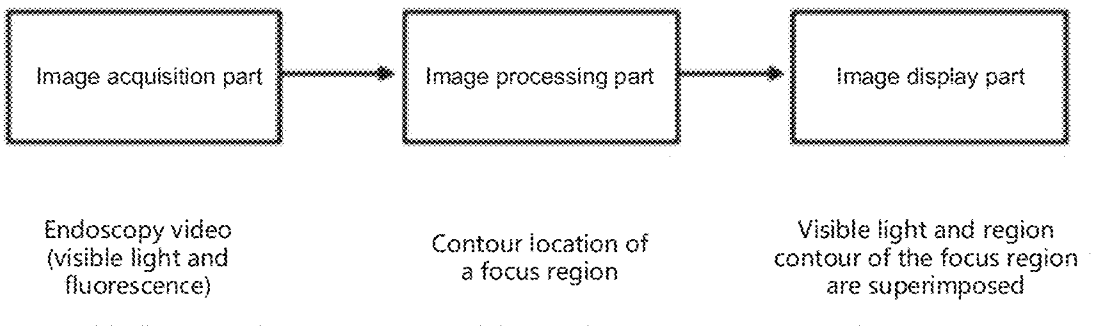
FIG. 6A is a structure diagram of an endoscope system in an embodiment of the present disclosure.

As illustrated in FIG. 6A, the endoscope system may include an image acquisition part, an image processing part, and an image display part. The image acquisition part is configured to obtain an endoscopic video, which includes a visible light image and a fluorescence image The image processing part is configured to fuse the visible light image and the fluorescence image to obtain a fused image, detect the contour of the focus region on the fused image to obtain the region contour (i.e., the region contour corresponding to the diseased tissue), or directly detect the contour of the focus region on the fluorescence image to obtain the region contour. The image display part is configured to superimpose the regional contour on the visible light image for display and provide it to the doctor for use.

Figure 6B:
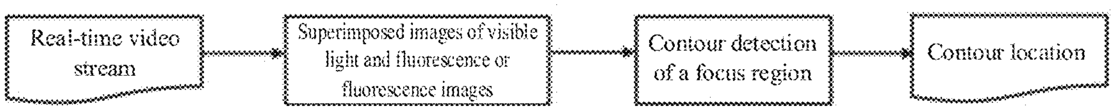
FIG. 6B is a schematic diagram of region contour detection in an embodiment of the present disclosure.

1. The image acquisition part. Two sensors at a front end of a mirror tube collect the reflected visible light and the excited fluorescence at the designated location of the target object, and generate image signals, and then transmit the image signals to the back end, and then the image signals are processed to obtain an endoscopic image. The two sensors are, respectively, a sensor used to collect visible light (recorded as a white light endoscope) and a sensor used to collect fluorescence (recorded as a fluorescence endoscope). The white light endoscope is configured to collect visible light and generate a corresponding white light image signal, and the endoscopic image generated based on the white light image signal is a visible light image. The fluorescence endoscope is configured to collect fluorescence and generate a corresponding fluorescence image signal, and the endoscopic image generated based on the fluorescence image signal is a fluorescence image. In summary, the image acquisition part may collect visible light images and fluorescence images.
2. The image processing part. Referring to FIG. 6B, the image processing part may obtain a real-time video stream, which may include visible light images and fluorescence images. Based on the fused image (i.e., the image after the visible light image and the fluorescence image are fused) or the fluorescence image, the image processing part may detect the contour of the focus region, obtain the region contour, and save the region contour of the focus region.

Figure 6C:
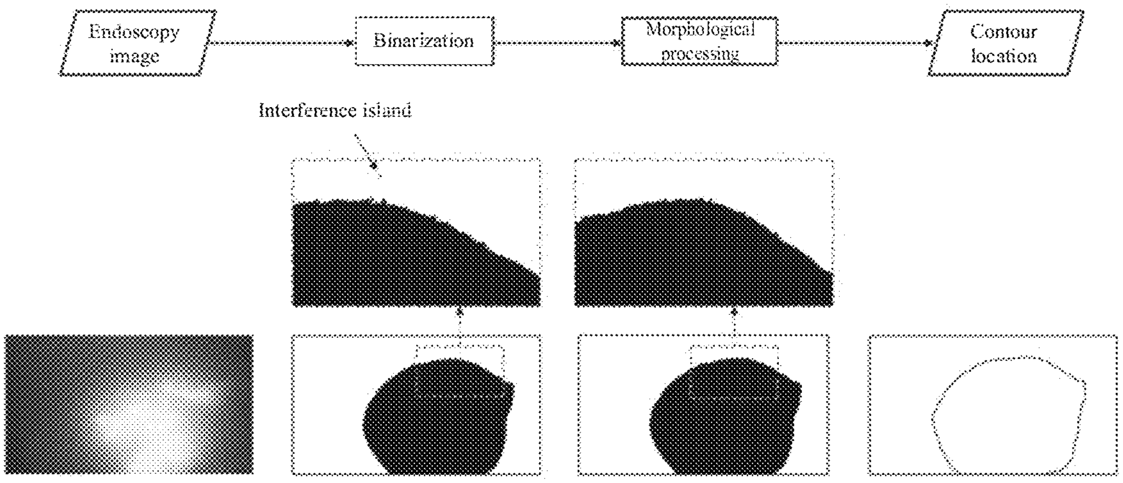
FIG. 6C is a schematic diagram of contour detection by using region segmentation in an embodiment of the present disclosure.

In a feasible implementation, as illustrated in FIG. 6C. contour detection may be performed by using a region segmentation method. For example, for the endoscopic image (e.g., the fluorescence image or the fused image), a threshold is set, and a local mean value binarization is used to obtain a binarized image. Afterwards, morphological processing is performed (e.g., using a 9*9 filter kernel to perform smooth processing to obtain a smooth edge and remove interference islands, etc.), and then the region contour of the focus region may be obtained.

In FIG. 6C, a fluorescence image in a positive development mode is taken as an example. As for a fluorescence image in a negative development mode, the implementation process is basically the same, where black and white may be inverted during binarization, which will not be repeated here.

For the implementation process of contour detection by using a region segmentation method, step 402 can be referred, and method 1 and method 2 in step 402 are region segmentation methods, which will not be repeated here.

In another feasible implementation, contour detection may be performed by using a machine learning method. For example, a target segmentation model is first obtained through training. For endoscopic images (such as fluorescence images or fused images), the endoscopic images may be input to the target segmentation model, and the target segmentation model outputs the region contour of the focus region. The implementation process of contour detection by using a machine learning method may refer to step 402, and method 3 in step 402 is a machine learning method, which will not be repeated here.

3. The image display part. The image display part is configured to superimpose the region contour obtained by the image processing part on the visible light image to obtain the target image, and display the target image on the screen for a doctor to view and provide a reference for cutting. The specific superimposing method may refer to step 403 and FIG. 5D, which will not be repeated here.

Figure 7:
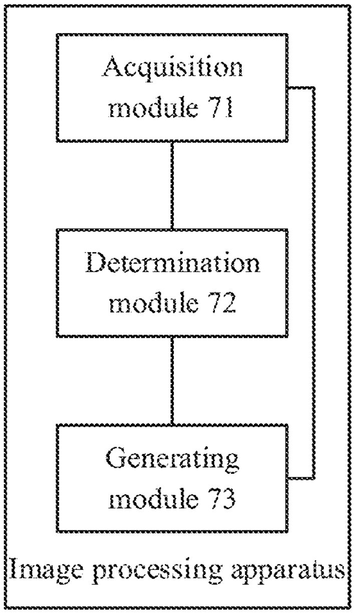
FIG. 7 is a structure diagram of an image processing apparatus in an embodiment of the present disclosure.

Based on the same application concept as the above method, embodiments of the present disclosure provide an image processing apparatus. Referring to FIG. 7, which is a structure diagram of an image processing apparatus, the apparatus may include:

an acquisition module 71, configured to acquire a visible light image and a fluorescence image corresponding to a designated location inside a target object, where the designated location includes diseased tissue and normal tissue;

a determination module 72, configured to determine a to-be-cut boundary corresponding to the diseased tissue from a to-be-detected image, where the to-be-detected image is the fluorescence image, or the to-be-detected image is a fused image of the visible light image and the fluorescence image;

a generating module 73, configured to generate a target image, where the target image includes the visible light image and the to-be-cut boundary.

For example, when determining the to-be-cut boundary corresponding to the diseased tissue from the to-be-detected image, the determination module 72 is configured to: determine the target region corresponding to the diseased tissue from the to-be-detected image, determine the region contour corresponding to the diseased tissue based on the target region, and determine the to-be-cut boundary corresponding to the diseased tissue based on the region contour.

For example, when determining the target region corresponding to the diseased tissue from the to-be-detected image, the determination module 72 is configured to: select the target pixel points corresponding to the diseased tissue from all the pixel points of the to-be-detected image based on a pixel value corresponding to each pixel point in the to-be-detected image respectively, acquire at least one connected component composed of the target pixel points in the to-be-detected image, and determine the target region from the to-be-detected image based on the at least one connected component.

For example, when selecting the target pixel points corresponding to the diseased tissue from all the pixel points of the to-be-detected image based on the pixel value corresponding to each pixel point in the to-be-detected image respectively, the determination module 72 is configured to: if the fluorescence image is a fluorescence image under a positive development mode, when a pixel value corresponding to a pixel point in the to-be-detected image is larger than a first threshold, determine that the pixel point is a target pixel point; where, in the positive development mode, the development region of the fluorescence image corresponds to the diseased tissue; or, if the fluorescence image is a fluorescence image under a negative development mode, when the pixel value corresponding to the pixel point in the to-be-detected image is smaller than a second threshold, determine that the pixel is a target pixel point; where, in the negative development mode, the non-development region of the fluorescence image corresponds to the diseased tissue.

For example, when selecting the target pixel points corresponding to the diseased tissue from all the pixel points of the to-be-detected image based on the pixel value corresponding to each pixel point in the to-be-detected image respectively, the determination module 72 is configured to: input the to-be-detected image to a trained target segmentation model, such that the target segmentation model determines, based on the pixel value corresponding to each pixel point in the to-be-detected image respectively, a predicted label value corresponding to each pixel point in the to-be-detected image respectively, where the predicted label value corresponding to each pixel point in the to-be-detected image is the first value or the second value; and the pixel point in the to-be-detected image whose predicted label value is the first value is determined as a target pixel.

For example, when training the target segmentation model, the determination module 72 is configured to: acquire a sample image and calibration information corresponding to the sample image, the calibration information including a calibration label value corresponding to each pixel point in the sample image respectively; where, if a first pixel point in the to-be-detected image is a pixel point corresponding to a diseased tissue, the calibration label value corresponding to the first pixel point is the first value, and if a second pixel point in the to-be-detected image is not a pixel point corresponding to a diseased tissue, the calibration label value corresponding to the second pixel point is the second value; input the sample image to the initial segmentation model, such that the initial segmentation model determines a predicted label value corresponding to each pixel point in the to-be-detected image respectively based on the pixel value corresponding to each pixel point in the sample image respectively; where the predicted label value corresponding to the pixel point in the to-be-detected image is the first value or the second value; determine a target loss value based on the calibration label value and the predicted label value corresponding to each pixel point in the to-be-detected image, and train the initial segmentation model based on the target loss value to obtain the target segmentation model.

For example, when determining the region contour corresponding to the diseased tissue based on the target region, the determination module 72 is configured to: determine boundary pixel points in the target region, and determine the region contour corresponding to the diseased tissue based on the boundary pixel points.

For example, when determining the to-be-cut boundary corresponding to the diseased tissue based on the region contour, the determination module 72 is configured to: determine the region contour as the to-be-cut boundary; or, if there is a coincident boundary between the region contour and an organ contour of an organ corresponding to the diseased tissue, determine the non-coincident boundary between the region contour and the organ contour as the to-be-cut boundary.

For example, when generating the target image, the generation module 73 is configured to: superimpose the to-be-cut boundary on the visible light image to obtain the target image; or, determine a target boundary feature, generate a target cut boundary based on the to-be-cut boundary and the target boundary feature, and superimpose the target cut boundary on the visible light image to obtain the target image.

For example, when generating the target cut boundary based on the to-be-cut boundary and the target boundary feature, the generation module 73 is configured to: if the target boundary feature is a target color, perform color adjustment on the to-be-cut boundary, to obtain the target cut boundary. where the color of the target cut boundary is the target color; if the target boundary feature is a target line type, perform line type adjustment on the to-be-cut boundary, to obtain the target cut boundary, where the line type of the target cut boundary is the target line type; if the target boundary feature is a target color and a target line type, perform color adjustment and line type adjustment on the to-be-cut boundary, to obtain the target cut boundary, where the color of the target cut boundary is the target color, and the line type of the target cut boundary is the target line type.

For example, after generating the target image, the generation module 73 is further configured to: if the fluorescence image is a fluorescence image in a positive development mode, and the fluorescence image includes a development region outside the to-be-cut boundary, superimpose the development region outside the to-be-cut boundary on the target image; if the fluorescence image is a fluorescence image in a negative development mode, and the fluorescence image includes a development region inside the to-be-cut boundary, superimpose the development region inside the to-be-cut boundary on the target image.

For example, when determining the to-be-cut boundary corresponding to the diseased tissue from the to-be-detected image, the determination module 72 is configured to: if a display switching command for the fluorescence image is received, the display switching command is configured to indicate displaying the to-be-cut boundary, determine the to-be-cut boundary corresponding to the diseased tissue from the to-be-detected image.

Based on the same application concept as the above method, embodiments of the present disclosure provide an image processing device (i.e., the camera system host of the above embodiment), the image processing device may include a processor and a machine-readable storage medium, where the machine-readable storage medium stores machine-executable instructions that can be executed by the processor, and the processor is configured to execute the machine-executable instructions to implement the image processing method disclosed in the examples of the present disclosure.

Based on the same application concept as the above method, embodiments of the present disclosure provide a machine-readable storage medium storing a plurality of computer instructions, and when the plurality of computer instructions are executed by one or more processors, the above image processing method disclosed in the examples of the present disclosure can be implemented.

The machine-readable storage medium may be any electronic, magnetic, optical, or other physical storage device, and may contain or store information, such as executable instructions, data, and so on. For example, the machine readable storage medium may be a Radom Access Memory (RAM), a volatile memory, a non-volatile memory, a flash memory, a storage drive (e.g. hard disk drive), a solid state harddisk, any type of storage disk (e.g., optical disks, DVDs, etc.), or a similar storage medium, or a combination thereof.

The system, apparatus, module, or unit described in the previous embodiments may be implemented by a computer chip or entity, or may be implemented by using a product with a certain function. An example of a device is a computer, and the form of the computer can be a personal computer, a laptop computer, a cellular phone, a camera phone, a smart phone, a personal digital assistant, a media player, a navigation device, an email sending and receiving device, a game console, a tablet computer, a wearable device, or a combination of any of these devices.

For convenience of description, when describing the above apparatus, the functions are divided into various units and described separately. Of course, when implementing the present disclosure, the functions of the units may be implemented in the same software or multiple software and/or hardware.

A person of ordinary skill in the art should understand that the implementations of the present disclosure may be provided as a method, a system, or a computer program product. Therefore, the present disclosure may take the form of an entirely hardware implementation, an entirely software implementation, or an implementation combining both software and hardware aspects. Moreover, the present disclosure may take the form of a computer program product implemented on one or more computer-usable storage media (including, but not limited to, disk memory, CD-ROM, optical memory, etc.) containing computer-usable program code.

The embodiments of this application are described with reference to flowcharts and/or block diagrams of the method, the terminal device (the system), and the computer program product in the embodiments of this application. It should be understood that, each process and/or block in the flowcharts and/or block diagrams as well as combinations of processes and/or blocks in the flowcharts and/or block diagrams may be implemented by computer program instructions. These computer program instructions may be provided to a processor of a general-purpose computer, a special purpose computer, an embedded processor or other programmable data processing device to generate a machine, such that the instructions executed by the processor of a computer or other programmable data processing device produce a device for achieving the functions specified in a flow chart or processes or processes and/or block diagram of one box or more boxes.

These computer program instructions may also be stored in computer-readable memory capable of booting a computer or other programmable data processing device to work in a particular manner, such that the instructions stored in the computer-readable memory produce manufactured products including an instruction device, the instruction device implements the function specified in a flow chart one or more processes and/or block diagram one box or more boxes.

These computer program instructions may also be stored in computer-readable memory capable of booting a computer or other programmable data processing device to work in a particular manner, such that the instructions stored in the computer-readable memory produce manufactured products including an instruction device, the instruction device implements the function specified in a flow chart one or more processes and/or block diagram one box or more boxes.

The above are implementations of the present disclosure and are not intended to limit the present disclosure. For those skilled in the art, this disclosure may have various modifications and changes. Any modification, equivalent replacement, and improvement made within the spirit and principle of this disclosure shall be included in the scope of claims of this disclosure.

The invention claimed is:

1. An image processing method, comprising:

acquiring a visible light image and a fluorescence image corresponding to a designated location inside a target object, wherein the designated location comprises diseased tissue and normal tissue;

determining a to-be-cut boundary corresponding to the diseased tissue from a to-be-detected image, wherein the to-be-detected image is the fluorescence image or a fused image of the visible light image and the fluorescence image; and generating a target image, wherein the target image comprises the visible light image and the to-be-cut boundary, wherein determining the to-be-cut boundary corresponding to the diseased tissue from the to-be-detected image comprises:

inputting the to-be-detected image to a trained target segmentation model, such that the target segmentation model determines, based on a respective pixel value corresponding to each pixel point in the to-be-detected image, a respective predicted label value corresponding to each pixel point in the to-be-detected image, wherein the respective predicted label value corresponding to each pixel point in the to-be-detected image is a first value or a second value:

determining a pixel point in the to-be-detected image with a predicted label value being the first value as a target pixel point;

acquiring at least one connected component composed of target pixel points in the to-be-detected image;

determining, based on the at least one connected component, a target region from the to-be-detected image;

determining boundary pixel points in the target region, and determining a region contour corresponding to the diseased tissue based on the boundary pixel points;

in response to determining that there is a coincident boundary between the region contour and an organ contour of an organ corresponding to the diseased tissue, determining a non-coincident boundary between the region contour and the organ contour as the to-be-cut boundary; and inputting the visible light image to a deep learning model, wherein the deep learning model outputs the organ contour of the organ corresponding to the diseased tissue, and wherein the coincident boundary between the region contour and the organ contour is an edge of the organ corresponding to the diseased tissue, wherein, when cutting along the non-coincident boundary, a region corresponding to the coincident boundary is also cut.

2. The method according to claim 1, wherein determining the to-be-cut boundary corresponding to the diseased tissue from the to-be-detected image comprises:

determining a target region corresponding to the diseased tissue from the to-be-detected image;

determining a region contour corresponding to the diseased tissue based on the target region; and determining the to-be-cut boundary corresponding to the diseased tissue based on the region contour.

3. The method according to claim 1, wherein a training process of the target segmentation model comprises:

acquiring a sample image and calibration information corresponding to the sample image, wherein the calibration information comprises a calibration label value corresponding to each pixel point in the sample image; wherein, in response to determining that a first pixel point in the sample image is a pixel point corresponding to the diseased tissue, a calibration label value corresponding to the first pixel point is the first value; and in response to determining that a second pixel point in the sample image is not a pixel point corresponding to the diseased tissue, a calibration label value corresponding to the second pixel point is the second value;

inputting the sample image to an initial segmentation model, such that the initial segmentation model determines, based on a pixel value corresponding to each pixel point in the sample image respectively, a predicted label value corresponding to each pixel point in the sample image respectively, wherein the predicted label value corresponding to each pixel point in the sample image is the first value or the second value; and determining a target loss value based on the calibration label value and the predicted label value corresponding to each pixel point in the sample image respectively, and training the initial segmentation model based on the target loss value, to obtain the target segmentation model.

4. The method according to claim 1, wherein generating the target image comprises:

determining a target boundary feature, generating a target cut boundary based on the to-be-cut boundary and the target boundary feature, and superimposing the target cut boundary on the visible light image to obtain the target image.

5. The method according to claim 4, wherein generating the target cut boundary based on the to-be-cut boundary and the target boundary feature comprises:

in response to determining that the target boundary feature is a target color, performing color adjustment on the to-be-cut boundary, to obtain the target cut boundary, wherein a color of the target cut boundary is the target color.

6. The method according to claim 1, wherein after generating the target image, the method further comprises:

in response to determining that the fluorescence image is a fluorescence image in a positive development mode, and the fluorescence image comprises a development region outside the to-be-cut boundary, superimposing the development region outside the to-be-cut boundary on the target image; and in response to determining that the fluorescence image is a fluorescence image in a negative development mode, and the fluorescence image comprises a development region inside the to-be-cut boundary, superimposing the development region inside the to-be-cut boundary on the target image.

7. The method according to claim 1, wherein determining the to-be-cut boundary corresponding to the diseased tissue from the to-be-detected image comprises:

in response to determining that a display switching command for the fluorescence image is received, and the display switching command is configured to instruct displaying the to-be-cut boundary, determining the to-be-cut boundary corresponding to the diseased tissue from the to-be-detected image.

8. An image processing device, comprising:

at least one processor and at least one non-transitory machine-readable storage medium, wherein the at least one machine-readable storage medium stores machine-executable instructions that are executable by the at least one processor to implement operations comprising:

acquiring a visible light image and a fluorescence image corresponding to a designated location inside a target object, wherein the designated location comprises diseased tissue and normal tissue;

determining a to-be-cut boundary corresponding to the diseased tissue from a to-be-detected image, wherein the to-be-detected image is the fluorescence image or a fused image of the visible light image and the fluorescence image; and generating a target image, wherein the target image comprises the visible light image and the to-be-cut boundary, wherein determining the to-be-cut boundary corresponding to the diseased tissue from the to-be-detected image comprises:

inputting the to-be-detected image to a trained target segmentation model, such that the target segmentation model determines, based on a respective pixel value corresponding to each pixel point in the to-be-detected image, a respective predicted label value corresponding to each pixel point in the to-be-detected image, wherein the respective predicted label value corresponding to each pixel point in the to-be-detected image is a first value or a second value;

determining a pixel point in the to-be-detected image with a predicted label value being the first value as a target pixel point;

acquiring at least one connected component composed of target pixel points in the to-be-detected image;

determining, based on the at least one connected component, a target region from the to-be-detected image;

determining boundary pixel points in the target region, and determining a region contour corresponding to the diseased tissue based on the boundary pixel points;

in response to determining that there is a coincident boundary between the region contour and an organ contour of an organ corresponding to the diseased tissue, determining a non-coincident boundary between the region contour and the organ contour as the to-be-cut boundary; and inputting the visible light image to a deep learning model, wherein the deep learning model outputs the organ contour of the organ corresponding to the diseased tissue, and wherein the coincident boundary between the region contour and the organ contour is an edge of the organ corresponding to the diseased tissue, wherein, when cutting along the non-coincident boundary, a region corresponding to the coincident boundary is also cut.

9. A non-transitory machine-readable storage medium storing computer instructions executable by one or more processors to implement operations comprising:

acquiring a visible light image and a fluorescence image corresponding to a designated location inside a target object, wherein the designated location comprises diseased tissue and normal tissue;

determining a to-be-cut boundary corresponding to the diseased tissue from a to-be-detected image, wherein the to-be-detected image is the fluorescence image or a fused image of the visible light image and the fluorescence image; and generating a target image, wherein the target image comprises the visible light image and the to-be-cut boundary, wherein determining the to-be-cut boundary corresponding to the diseased tissue from the to-be-detected image comprises:

inputting the to-be-detected image to a trained target segmentation model, such that the target segmentation model determines, based on a respective pixel value corresponding to each pixel point in the to-be-detected image, a respective predicted label value corresponding to each pixel point in the to-be-detected image, wherein the respective predicted label value corresponding to each pixel point in the to-be-detected image is a first value or a second value;

determining a pixel point in the to-be-detected image with a predicted label value being the first value as a target pixel point;

acquiring at least one connected component composed of target pixel points in the to-be-detected image;

determining, based on the at least one connected component, a target region from the to-be-detected image;

determining boundary pixel points in the target region, and determining a region contour corresponding to the diseased tissue based on the boundary pixel points:

in response to determining that there is a coincident boundary between the region contour and an organ contour of an organ corresponding to the diseased tissue, determining a non-coincident boundary between the region contour and the organ contour as the to-be-cut boundary; and inputting the visible light image to a deep learning model, wherein the deep learning model outputs the organ contour of the organ corresponding to the diseased tissue, and wherein the coincident boundary between the region contour and the organ contour is an edge of the organ corresponding to the diseased tissue, wherein when cutting along the non-coincident boundary, a region corresponding to the coincident boundary is also cut.

10. The method according to claim 1, wherein generating the target image comprises:

superimposing the to-be-cut boundary on the visible light image to obtain the target image.

11. The method according to claim 4, wherein generating the target cut boundary based on the to-be-cut boundary and the target boundary feature comprises:

in response to determining that the target boundary feature is a target line type, performing line type adjustment on the to-be-cut boundary, to obtain the target cut boundary, wherein a line type of the target cut boundary is the target line type.

12. The method according to claim 4, wherein generating the target cut boundary based on the to-be-cut boundary and the target boundary feature comprises:

in response to determining that the target boundary feature is a target color and a target line type, performing color adjustment and line type adjustment on the to-be-cut boundary, to obtain the target cut boundary, wherein a color of the target cut boundary is the target color, and a line type of the target cut boundary is the target line type.

* * * * *